United States Patent
Heyne et al.

(10) Patent No.: US 10,933,764 B2
(45) Date of Patent: Mar. 2, 2021

(54) CONVERTER CONFIGURATION FOR AN ELECTRICITY CHARGING STATION AND CORRESPONDING ELECTRICITY CHARGING STATION

(71) Applicants: Dr. Ing. h.c. F. Porsche Aktiengesellschaft, Stuttgart (DE); ads-tec GmbH, Nürtingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Ali Natour, Hochdorf (DE)

(73) Assignees: Dr. Ing. h.c. F. Porsche Aktiengesellschaft; ads-tec GmbH

( * ) Notice: Subject to any disclaimer, the term of this patent is extended or adjusted under 35 U.S.C. 154(b) by 5 days.

(21) Appl. No.: 16/152,658

(22) Filed: Oct. 5, 2018

(65) Prior Publication Data
US 2019/0106008 A1    Apr. 11, 2019

(30) Foreign Application Priority Data
Oct. 6, 2017 (DE) ............ 10 2017 217 753.5

(51) Int. Cl.
| | |
|---|---|
| *B60L 53/30* | (2019.01) |
| *H02J 7/00* | (2006.01) |
| *B60L 53/20* | (2019.01) |
| *B60L 53/10* | (2019.01) |
| *B60L 53/14* | (2019.01) |
| *H02J 7/02* | (2016.01) |

(Continued)

(52) U.S. Cl.
CPC ............ *B60L 53/30* (2019.02); *B60L 53/11* (2019.02); *B60L 53/14* (2019.02); *B60L 53/20* (2019.02); *B60L 53/305* (2019.02); *B60L 53/53* (2019.02); *H02J 7/0027* (2013.01); *H02J 7/0029* (2013.01); *H02J 7/022* (2013.01); *H02J 7/34* (2013.01); *B60L 2210/10* (2013.01); *B60L 2210/30* (2013.01); *H02J 2207/40* (2020.01)

(58) Field of Classification Search
CPC ........................................ B60L 53/30
USPC .................................... 320/109
See application file for complete search history.

(56) References Cited

U.S. PATENT DOCUMENTS

| | | |
|---|---|---|
| 5,686,768 A | 11/1997 | Thomsen et al. |
| 2004/0189251 A1 | 9/2004 | Kutkut et al. |

(Continued)

FOREIGN PATENT DOCUMENTS

| | | |
|---|---|---|
| DE | 10-2011006146 A1 | 9/2012 |
| DE | 102011056377 A1 | 1/2013 |

(Continued)

OTHER PUBLICATIONS

German Search Report for German Application No. 10 2017 2 753.5, dated Aug. 3, 2018, with partial translation—8 pages.

*Primary Examiner* — Eric D Lee
(74) *Attorney, Agent, or Firm* — RatnerPrestia

(57) ABSTRACT

A converter configuration for an electricity charging station having the following features: a rectifier for connection of the charging station to a public low-voltage network, a first DC voltage converter connected to the rectifier and a first DC chopper connected to the first DC voltage converter for connection of a battery to the charging station and a corresponding electricity charging station.

8 Claims, 1 Drawing Sheet

(51) Int. Cl.
  *B60L 53/53*   (2019.01)
  *H02J 7/34*    (2006.01)

(56) References Cited

U.S. PATENT DOCUMENTS

| | | | |
|---|---|---|---|
| 2008/0067974 A1 | 3/2008 | Zhang et al. | |
| 2011/0144842 A1* | 6/2011 | Ni | B60W 10/26 |
| | | | 701/22 |
| 2012/0043923 A1* | 2/2012 | Ikriannikov | H02J 1/10 |
| | | | 320/103 |
| 2012/0074901 A1 | 3/2012 | Mohammed | |
| 2012/0181990 A1 | 7/2012 | Asakura et al. | |
| 2012/0326516 A1 | 12/2012 | Gurunathan et al. | |
| 2013/0049674 A1* | 2/2013 | Davis | B60L 53/30 |
| | | | 320/101 |
| 2014/0320084 A1* | 10/2014 | Masuda | H02J 7/35 |
| | | | 320/109 |
| 2014/0347005 A1* | 11/2014 | Zhou | H02M 3/33561 |
| | | | 320/107 |
| 2015/0061569 A1 | 3/2015 | Alexander et al. | |
| 2015/0202973 A1 | 7/2015 | Chang et al. | |
| 2015/0328999 A1 | 11/2015 | Dureau et al. | |
| 2015/0349562 A1* | 12/2015 | Minegishi | H02M 3/33507 |
| | | | 320/107 |
| 2016/0075236 A1 | 3/2016 | Gase et al. | |

FOREIGN PATENT DOCUMENTS

| | | |
|---|---|---|
| DE | 102013207514 A1 | 10/2014 |
| DE | 102015010713 A1 | 2/2017 |
| DE | 102015214236 A1 | 2/2017 |
| EP | 2875985 A1 | 5/2015 |
| JP | 2012019602 A | 1/2012 |
| RU | 2133543 C1 | 7/1999 |
| WO | 2014009369 A2 | 1/2014 |
| WO | 2014130046 A1 | 8/2014 |
| WO | 2015103164 A1 | 7/2015 |

* cited by examiner

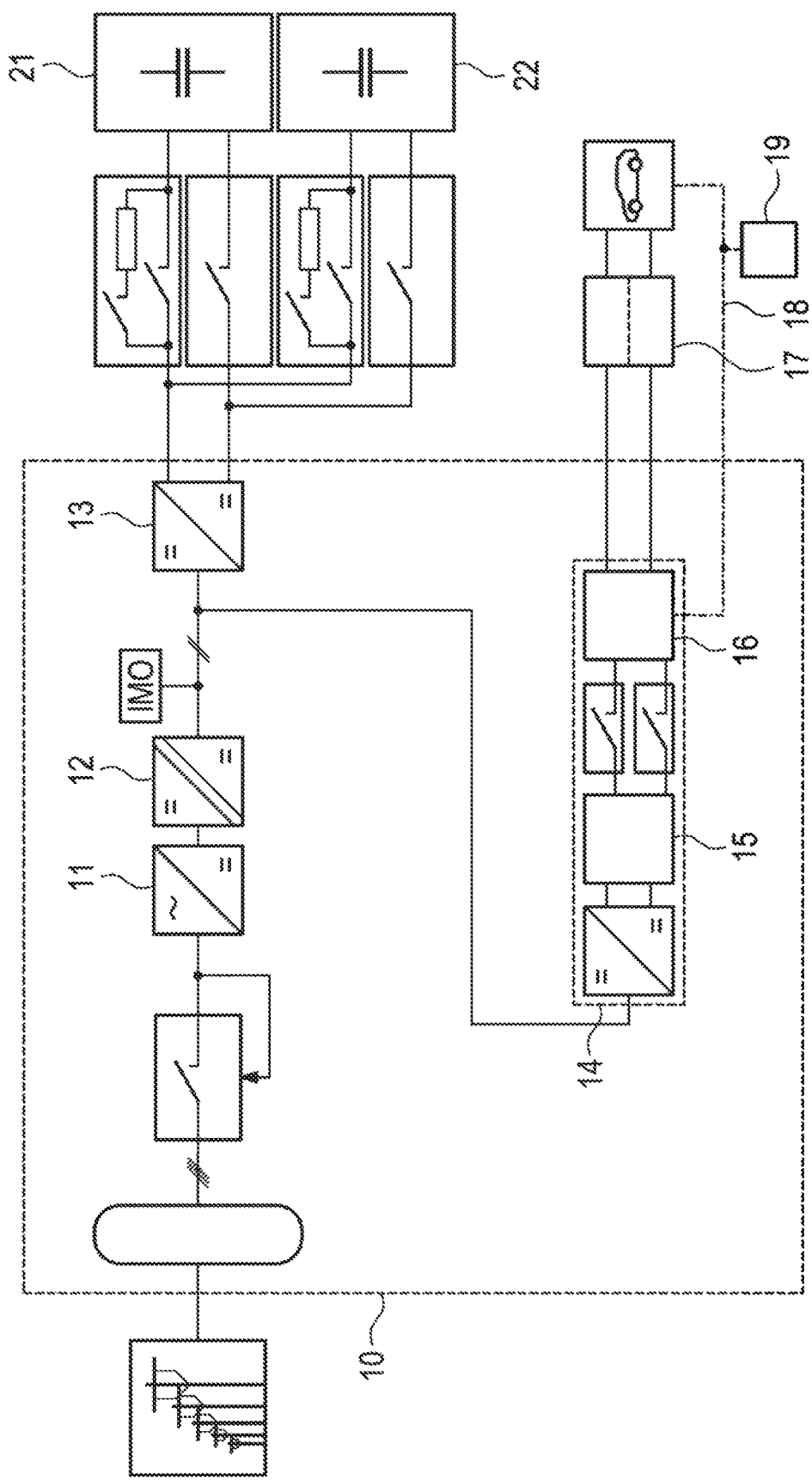

CONVERTER CONFIGURATION FOR AN ELECTRICITY CHARGING STATION AND CORRESPONDING ELECTRICITY CHARGING STATION

CROSS-REFERENCE TO RELATED APPLICATION

This application claims priority to German Patent Application No. 10 2017 217 753.5, filed Oct. 6, 2017, the content of such application being incorporated by reference herein in its entirety.

FIELD OF THE INVENTION

The present invention relates to a converter configuration for an electricity charging station. The present invention also relates to a corresponding electricity charging station.

BACKGROUND OF THE INVENTION

In electrical engineering, any stationary device or electrical system that serves for supplying energy to mobile, battery-operated units, machines or motor vehicles by way of simple setting or insertion without it being necessary for the energy storage—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/ high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example. Situated in the vehicle is a battery management system, which communicates with the charging column directly or indirectly in order to adapt the current intensity, or to terminate the process when a capacity limit is reached.

The power, electronics system is usually located in this case in the charging column. Since the direct-current connections of the charging column are connected directly to corresponding connections of the traction battery, it is thus possible for high charging currents to be transmitted with little loss, which allows short charging times.

In the various charging, stations used worldwide, a wide variety of topologies are used for the power electronics system. Known in particular are charging stations that additionally use an energy storage in the form of a battery. However, a plurality of topologies in the power electronics system are also possible for the connection of a battery.

For instance, US 2015202973 and WO 15103164, both of which are incorporated by reference herein, disclose converter constructions for a charging station for electric vehicles, which converter constructions enable additional energy storage batteries to be installed in the respective charging station. The arrangement consists in each case of a rectifier connected to the network followed by a DC voltage converter or DC chopper. The respective battery is connected on one side to the electricity network and on the other side to the charging station.

JP 2012019602, US 2015328999 and US 2012074901, all of which are incorporated by reference herein, describe further fast-charging columns for charging electric vehicles with additional energy storage batteries.

US 2015061569 and US 2008067974, both of which are incorporated by reference herein, finally discuss in each case a vehicle charging station with an additional energy storage and a network connection connected by means of a converter.

SUMMARY OF THE INVENTION

The invention provides a charging station for an electricity charging station and a corresponding electricity charging station according to the independent claims.

A preferred embodiment of the invention is based on a network connection with 55 kW via a small AC/DC rectifier. A small DC/DC converter then follows. Finally, a DC/DC controller for the battery follows in order to charge the energy from the network into the storage battery or to discharge the battery and provide a large amount of power for charging the vehicle. Furthermore, a DC/DC controller is also provided for the vehicle, which DC/DC controller concentrates the power from the network and from the battery and provides the desired charging voltage of 200 to 950 V to the vehicle.

The proposed approach is based on the knowledge that there are various ways to design a converter topology in a charging station. A contained battery can thus be integrated in a wide variety of ways. Converters can likewise be used in a very wide variety of numbers. The conceivable solutions differ here significantly in terms of their efficiency.

The invention also takes into account the fact that most known charging solutions provide charging columns, which draw the required charging energy directly from the network and therefore do not have an additional storage. An additional storage can be added very easily in these charging columns by virtue of said storage being connected on the AC side to the network and to the charging column. This is not necessarily the most efficient solution. Also, additional stores are often not accommodated in the same housing as the charging column or the power electronics system, which requires more outlay in terms of installation. The charging columns furthermore often have a specific minimum size because topologies with outdated IGBT technologies are used. These are cheap but require more installation space.

In contrast, one preference of the invention disclosed here lies in the introduced possibility of installing the energy storage—in this case a battery—in the same housing as the power electronics system in order to minimize the installation outlay. The overall solution is also very compact in order not to obstruct the visibility in road traffic significantly. This requires the use of very fast converter topologies at high switching frequencies, which in turn requires the use of SiC MOS modules. In this case, the battery is accommodated in the DC part, which improves the efficiency of the charging station and significantly reduces the production costs thereof.

Further advantageous configurations of the invention are specified in the dependent patent claims.

BRIEF DESCRIPTION OF THE DRAWING

One exemplary embodiment of the invention is illustrated in the drawing and is described in more detail below.

The single FIGURE shows a converter configuration according to aspects of the invention.

DETAILED DESCRIPTION OF THE INVENTION

The FIGURE illustrates by way of example an electricity charging station equipped with a charging station (10) according to aspects of the invention. A rectifier (AC/DC converter 11) serves here for connection to the public TN or TT low-voltage network. A first DC voltage converter (DC/DC converter 12) connected to said rectifier (11) transmits the voltage for protection against ground faults to the internal IT network of the charging station (10).

At this location, essentially two power paths split up inside the charging station (10): a first DC chopper (13) feeds the connected battery (21, 22) comprising strings (21, 22), of which there are two in accordance with the image, and allows the energy stored in such a way to be fed back for the accelerated charging of connected vehicles. Each string may include multiple modules and each module may include multiple cells. For the supply of power to said connected vehicles, a second DC chopper (14) is provided with, for example, a DC EMC filter (15) connected downstream and, for example, a second DC voltage converter (16), preferably operated in discontinuous conduction mode (DCM), which second DC chopper and second DC voltage converter have suitably protected connection lines for the purpose of power transmission. The associated pilot line (18) can be provided with an overvoltage protection system (19) depending on the charging standard and the charging voltage.

What is claimed is:

1. An electricity charging station, comprising:
    a rectifier for connection of the electricity charging station to a public low-voltage network,
    a first DC voltage converter connected to the rectifier, the first DC voltage converter being a DC/DC converter;
    a first DC chopper connected to the first DC voltage converter for connection of a battery to the electricity charging station;
    the battery connected to the first DC chopper, the battery configured to store power received via the first DC voltage converter and the first DC chopper; and
    a housing, the rectifier, the first DC voltage converter, the first DC chopper, and the battery all accommodated in the housing,
    wherein the first DC voltage converter is connected between the rectifier and the first DC chopper to provide power received from the rectifier to the first DC chopper.

2. The electricity charging station as claimed in claim 1, further comprising:
    a second DC chopper connected to the first DC voltage converter for connection of an electric automobile to the electricity charging station.

3. The electricity charging station as claimed in claim 2, further comprising:
    an EMC filter connected downstream of the second DC chopper.

4. The electricity charging station as claimed in claim 3, further comprising:
    a second DC voltage converter connected downstream of the EMC filter and configured for a discontinuous conduction mode.

5. The electricity charging station as claimed in claim 4, further comprising:
    a lightning protection system connected to the second DC voltage converter for connection of the electric automobile.

6. The electricity charging station as claimed in claim 4, further comprising:
    a pilot line connected to the second DC voltage converter for connection of the electric automobile.

7. The electricity charging station as claimed in claim 6, further comprising:
    an overvoltage protection system connected to the pilot line.

8. The electricity charging station as claimed in claim 1, wherein:
    the battery comprises a plurality of strings.

* * * * *